No. 839,594.
PATENTED DEC. 25, 1906.
C. R. JOHNSON & C. KNOPF.
SPEED AND DISTANCE INDICATOR FOR VEHICLES.
APPLICATION FILED JAN. 11, 1906.
3 SHEETS—SHEET 1.
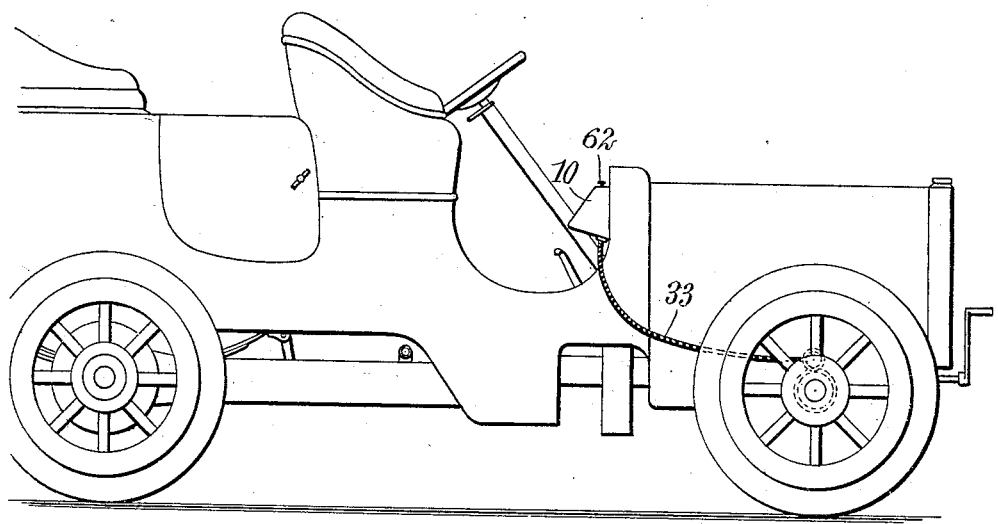
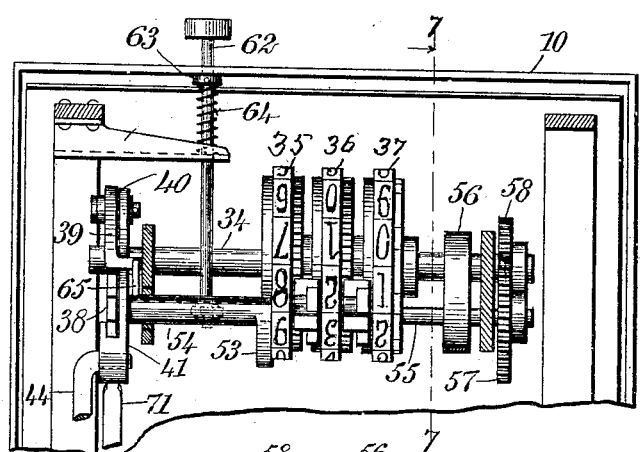
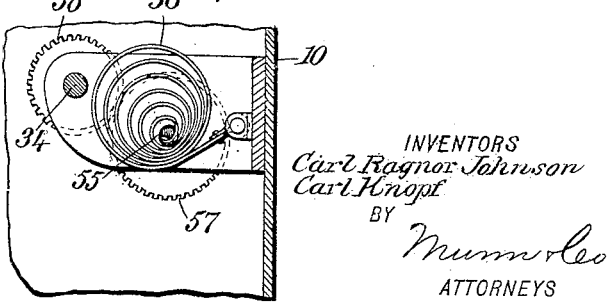
WITNESSES:
INVENTORS
Carl Ragnor Johnson
Carl Knopf
BY
Munn & Co
ATTORNEYS No. 839,594. PATENTED DEC. 25, 1906.
C. R. JOHNSON & C. KNOPF.
SPEED AND DISTANCE INDICATOR FOR VEHICLES.
APPLICATION FILED JAN. 11, 1906.
3 SHEETS—SHEET 2.
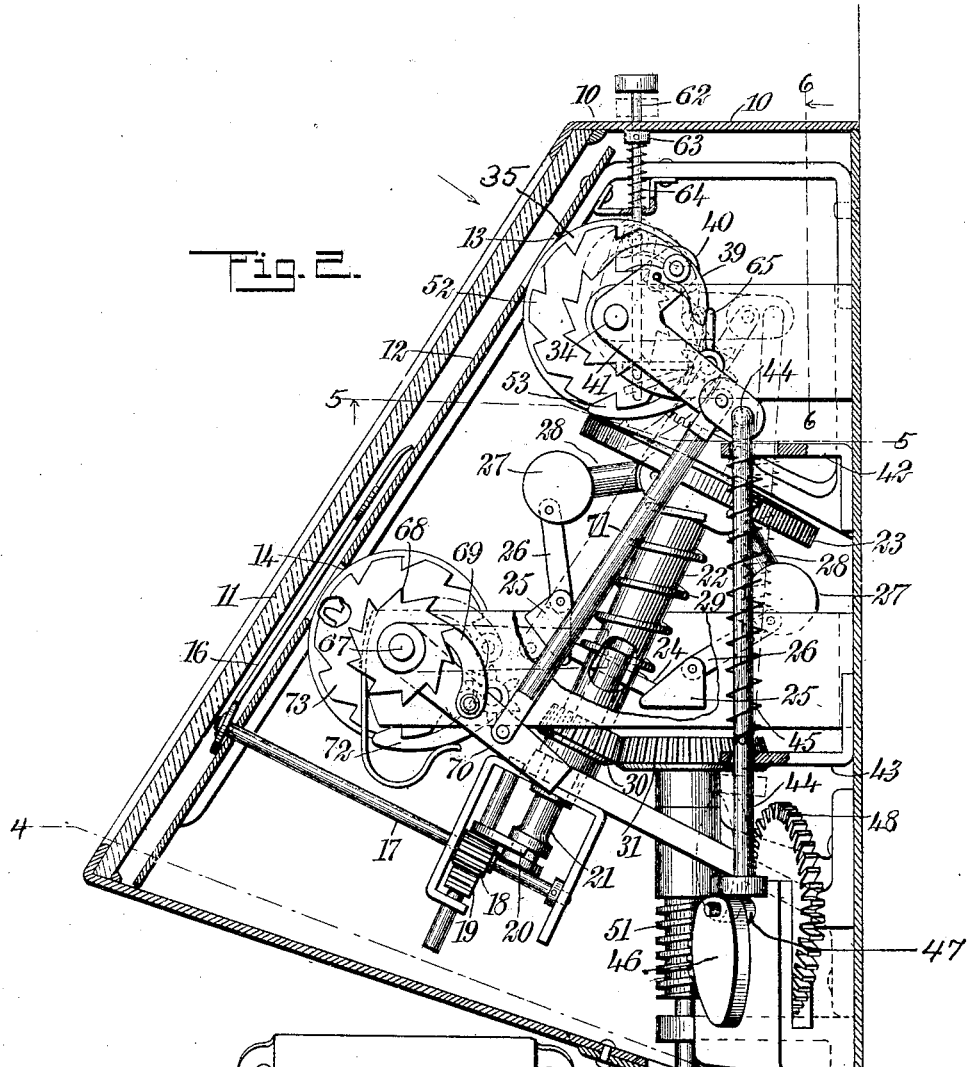
WITNESSES:
INVENTORS
Carl Ragnor Johnson
Carl Knopf
BY
ATTORNEYS No. 839,594. PATENTED DEC. 25, 1906.
C. R. JOHNSON & C. KNOPF.
SPEED AND DISTANCE INDICATOR FOR VEHICLES.
APPLICATION FILED JAN. 11, 1906.
3 SHEETS—SHEET 3.
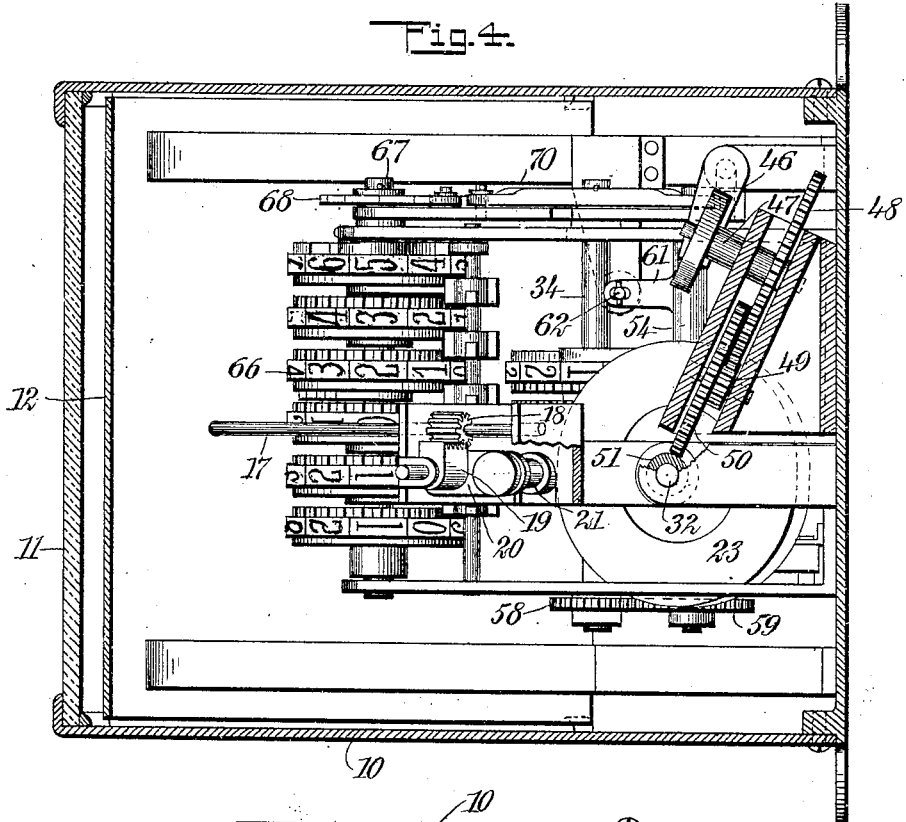
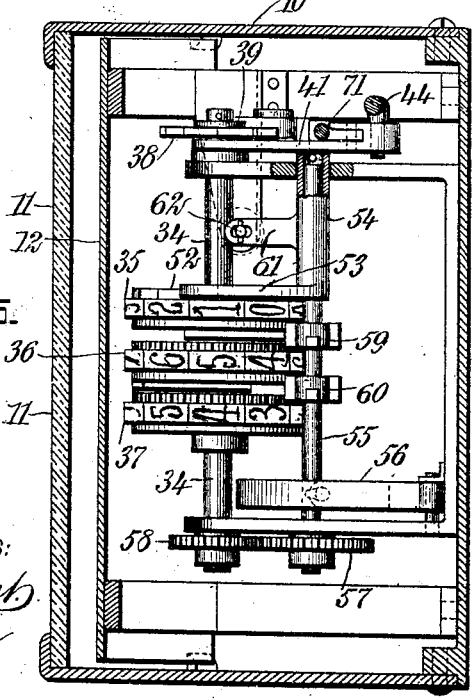
WITNESSES:
L. Almquist
C. R. Ferguson
INVENTORS
Carl Ragnar Johnson
Carl Knopf
BY
Munn & Co.
ATTORNEYS

UNITED STATES PATENT OFFICE.

CARL RAGNOR JOHNSON AND CARL KNOPF, OF NEW YORK, N. Y.; SAID JOHNSON ASSIGNOR TO SAID KNOPF.

SPEED AND DISTANCE INDICATOR FOR VEHICLES.

No. 839,594.

Specification of Letters Patent.

Patented Dec. 25, 1906.

Application filed January 11, 1906. Serial No. 295,557.

*To all whom it may concern:*

Be it known that we, CARL RAGNOR JOHNSON, a subject of the King of Sweden, and CARL KNOPF, a citizen of the United States, residents of the city of New York, borough of Brooklyn, in the county of Kings and State of New York, have invented a new and Improved Speed and Distance Indicator for Vehicles, of which the following is a full, clear, and exact description.

This invention relates to improvements in devices designed to be attached to vehicles, particularly automobiles, to indicate the speed of travel, the number of miles covered in a single run, and the total number of miles traveled, the object being to provide a device of this character that will be comparatively simple in construction, having no parts liable to get out of order, and that will be accurate in its operation.

Other objects of the invention will appear in the general description.

We will describe a speed and distance indicator for vehicles embodying our invention and then point out the novel features in the appended claims.

Reference is to be had to the accompanying drawings, forming a part of this specification, in which similar characters of reference indicate corresponding parts in all the figures.

Figure 1 is a side elevation of an automobile, showing a device embodying our invention thereon. Fig. 2 is a sectional elevation of the improvement. Fig. 3 is a face view of the indicator. Fig. 4 is a section on the line 4 4 of Fig. 2. Fig. 5 is a section on the line 5 5 of Fig. 2. Fig. 6 is a section on the line 6 6 of Fig. 2, and Fig. 7 is a section on the line 7 7 of Fig. 6.

The device comprises a casing 10 of suitable material—such, for instance, as metal—and having a glass front wall 11, which is inclined downward and rearward, so that the indicating device may be readily seen therethrough by a person in the vehicle, as the device is secured in the vehicle forward of the seat. Inward of the glass front or wall 11 is a plate 12, having an opening 13 near its upper end, through which indicating-disks having numbers thereon may be disclosed, and near the lower portion the plate is provided with an opening 14, through which the numerals of any set of mileage-indicating disks may be disclosed. These mileage-indicating disks will be hereinafter described. Also on the front of the plate 12 is a numbered scale 15 for indicating the speed of the vehicle, and movable over this scale 15 is a pointer 16, mounted on a shaft 17, which extends through said plate and has bearings in hangers in the casing.

On the shaft 17 is a pinion 18, engaged by a rack 19, movable vertically in said hanger, and on one stem of this rack is a bifurcated arm 20, engaging in an angular channel formed in the lower end of a governor-rod 21. This governor-rod 21 passes into a sleeve 22, on the upper end of which is a disk 23.

A cross-bar 24 is attached to the upper end of the governor-rod 21 and passes outward through slots in the sleeve 22, and on the outer ends of this cross-bar 24 are blocks 25, which have link connections 26 with the governor-balls 27, mounted on the arms 28, which have swinging connection with the under side of the disk 23. Between the disk 23 and the cross-bar 24 is a spring 29, which tends to force said cross-bar downward. On the lower portion of the sleeve 22 is a beveled pinion 30, meshing with a bevel-gear 31 on a shaft 32, which extends down through the bottom of the casing and is engaged by a flexible shaft 33, operated by a rotary part of the vehicle. By this arrangement when the vehicle is in movement the shaft 32 will be rotated, and this shaft will obviously impart rotary movement to the sleeve 22. As the speed increases the governor-balls will be thrown outward by centrifugal force, throwing the governor-rod 21 upward, so that the rack 19, moving upward with the rod, will by engaging with the pinion 18 rotate the shaft 17 and move the pointer 16 over the scale 15. As the speed lessens the rod 21 will be moved downward by the spring 29 as the governor-balls swing inward. This of course will impart a reverse movement to the pointer.

In the upper portion of the casing and mounted on a shaft 34 are numeral-wheels designed for indicating the number of miles covered on a trip or run. The said disks have peripheral numbers from naught to nine. The units-disk 35 is rigidly mounted on the shaft 34, while the tens-disk 36 and the hundreds-disk 37 are loosely mounted on the shaft, the said tens-disk being, as in all devices of this character, moved one step at each complete rotation of the units disk or wheel, and the hundreds disk or wheel is moved one step at each complete rotation of the tens disk or wheel.

Secured to one end of the shaft 34 is a ratchet-wheel 38, engaged by a pawl 39, pivoted to an arm 40, mounted to swing on the shaft 34, and from this arm 40 another arm 41 extends downward, the two arms practically forming an angle-lever.

Extended downward from the arm portion 41 of said angle-lever and having bearings in brackets 42 43 is an actuating-rod 44, which is moved downward by a surrounding spring 45, the said spring engaging at its upper end with the upper bracket 42 and at its lower end with a pin passed through said actuating-rod. The said rod is moved upward by means of a cam 46, attached to a shaft 47, which carries a gear-wheel 48, meshing with a pinion 49, on the shaft of which is a worm-wheel 50, which engages a worm 51 on the shaft 32.

On one side of the units-disk wheel 35 is a toothed plate 52, engaged by a detent-pawl 53 to prevent backward movement or overthrowing of said units-disk. This detent-pawl is extended from a sleeve 54, attached to the arm 41, and this sleeve surrounds the rewinding-shaft 55, Fig. 7, and with said shaft 55 the inner end of a rewinding-spring 56 engages, while the other end is fastened in the casing. Also on this rewinding-shaft 55 is a gear-wheel 57, meshing with a pinion 58 on the shaft 34.

Loosely mounted on the said shaft 55 and between the units and tens wheels is a collar 59, Fig. 5, provided with teeth, one of which is adapted to be engaged by a part carried by the units-wheel upon its complete rotation, and the other tooth is designed to engage with a part carried by the tens-wheel to move it one step upon said complete rotation of the units-wheel. A similar shifting device 60 is arranged between the tens and hundreds wheel.

It will be noted in Fig. 2 that the opening in the bracket 42 through which the rod 44 passes is in the form of a slot, so that said rod in its upward movement may swing outward, as indicated by the dotted lines in Fig. 2.

From an arm 61 a rod 62 extends upward through the top of the casing, and between the collar 63 within the casing and the said arm 61 is a spring 64, which serves to move the rod in one direction. Carried by the sleeve 54 is a pin 65, Fig. 6, for engaging with the heel end of the pawl 39.

The mechanism just described is employed for returning the numeral disks or wheels to normal position upon the completion and return from a trip—that is, as the vehicle is traveling the worm 51 will impart motion to the train of gearing, consequently rotating the cam 50, and this cam by forcing the rod 44 upward will operate the numeral-disks through the agency of the pawl 39. During this operation the spring 56 will be wound, and when it is desired to reset the wheels a downward push on the rod 62 will rock the sleeve 54, moving the retarding-pawl 53 out of engagement with the part 52, and this rocking of the sleeve through the agency of the pin 65 will move the pawl 39 out of engagement with the ratchet-wheel 38. Thus the spring in unwinding will rotate the shaft 34 in a reverse direction, resetting all the wheels.

In the lower portion of the casing is another set of numeral disks or wheels 66, designed for indicating the total number of miles run by the vehicle. These disks or wheels are similar to those first described, although there are more of them, and there is no means provided for automatically resetting them. The wheels 66 are mounted on a shaft 67, and on this shaft is a ratchet-wheel 68, engaged by a pawl 69, pivoted to an arm 70, mounted to swing on said shaft, and from this arm 70 a draw-rod 71 extends upward to pivotal connection with the arm 41, and on this series of wheels a retarding-pawl 72 engages with teeth on a disk 73, secured to the outer side of the units-wheel. These lower numeral-disks obviously will be moved by the operation of the first-named numeral-disks.

Having thus described our invention, we claim as new and desire to secure by Letters Patent—

1. In a device of the character described, a shaft, numeral-disks mounted on said shafts, a ratchet-wheel on said shaft, an actuating-pawl for engaging with said ratchet-wheel, a retarding-pawl engaging with one of the disks, a resetting-shaft, a spring having its inner end connected to said resetting-shaft and its outer end connected to a fixed part, gear connections between the two shafts, and means for moving the actuating-pawl and the retarding-pawl simultaneously out of engagement with the parts normally engaged by them.

2. A device for the purpose specified, comprising a shaft, numeral-disks mounted on the said shaft, a ratchet-wheel on the shaft, an actuating-pawl engaging with said ratchet-wheel, a swinging arm carrying said pawl, means for swinging the arm, a sleeve extended inward from said arm, a retarding-pawl carried by said sleeve, a tooth-disk on one of the numeral-disks with which said retarding-pawl is designed to engage, an arm extended forward from said sleeve, a rod projecting upward from said arm through the casing of the device, a resetting-shaft having a bearing in said sleeve, a spring having its inner end connected to said resetting-shaft and its outer end connected to a fixed part, gear connections between the two shafts, and a part carried by said sleeve for engaging with the first-named pawl to move it out of engagement with the ratchet-wheel.

3. In a device for the purpose specified, a casing, two sets of numeral-disks arranged in the casing, a pawl, a ratchet mechanism for operating the first set of numeral-disks, a pawl-and-ratchet mechanism for operating the second set of numeral-disks, a connection between the two pawl-and-ratchet mechanisms whereby they will operate together, an angle-lever carrying the first-named pawl, a rod extended downward from said angle-lever, a cam engaging with the lower end of said rod, and a gearing actuated from the rotary part of the vehicle, for moving said cam.

4. In a device for the purpose specified, a casing, a shaft arranged in the upper part of the casing, a series of numeral-disks on said shaft, a ratchet-wheel on the shaft, a pawl engaging with said ratchet-wheel, a rocking arm carrying said pawl, a shaft arranged in the lower portion of the casing, a plurality of numeral-disks mounted on the lower shaft, a ratchet-wheel on said lower shaft, a pawl engaging therewith, an arm carrying said pawl, a rod connection between said arm and the first-named arm, a rod extended downward from the first-named arm, a cam engaging with said downwardly-extended arm, a worm-shaft, and gear connections between the worm and said cam.

5. In a device for the purpose specified, a casing, an upper shaft arranged in the casing, a plurality of numeral-disks mounted on said shaft, a ratchet-wheel on the shaft, a pawl engaging with the ratchet-wheel, a rocking arm carrying said pawl, a lower shaft, a plurality of numeral-disks on the lower shaft, a ratchet-wheel on the lower shaft, a pawl engaging therewith, a rocking arm carrying said last-named pawl, a connection between the said two arms, a rod extended downward from the first-named arm, a spring for moving said rod downward, a cam for moving said rod upward, a gear-wheel on the shaft of the cam, a pinion meshing with said gear-wheel, a worm-wheel on the shaft of the pinion, a worm-shaft and a worm on said worm-shaft engaging with the worm-wheel.

In testimony whereof we have signed our names to this specification in the presence of two subscribing witnesses.

CARL RAGNOR JOHNSON.
CARL KNOPF.

Witnesses:
EDITH M. DUTCHER,
GEO. H. MORAND.